United States Patent [19]

Iwaguchi et al.

[11] Patent Number: 5,629,511
[45] Date of Patent: May 13, 1997

[54] BAR CODE SCANNER AND SCANNING SYSTEM FOR VARIOUS TYPES OF OPERATIONS

[75] Inventors: Isao Iwaguchi; Shinichi Sato; Ichiro Shinoda, all of Kawasaki, Japan

[73] Assignee: Fujitsu Limited, Kawasaki, Japan

[21] Appl. No.: 392,117

[22] Filed: Feb. 22, 1995

[30] Foreign Application Priority Data

Mar. 4, 1994 [JP] Japan ..................... 6-035079

[51] Int. Cl.$^6$ ..................... G06K 7/10
[52] U.S. Cl. ..................... 235/462; 235/383
[58] Field of Search ..................... 235/462, 467, 235/383, 454

[56] References Cited

U.S. PATENT DOCUMENTS

| | | | |
|---|---|---|---|
| 3,801,775 | 4/1974 | Acker | 235/462 X |
| 4,393,410 | 7/1983 | Ridge et al. | 358/285 |
| 4,958,064 | 9/1990 | Kirkpatrick | 235/384 |
| 5,150,212 | 9/1992 | Han | 358/147 |
| 5,307,297 | 4/1994 | Iguchi et al. | 364/708.1 |
| 5,495,097 | 2/1996 | Katz et al. | 235/462 |

*Primary Examiner*—Donald T. Hajec
*Assistant Examiner*—Jeffrey R. Filipek
*Attorney, Agent, or Firm*—Armstrong, Westerman, Hattori, McLeland & Naughton

[57] ABSTRACT

A bar code scanner includes a detection unit for detecting light reflected from a bar code and generating a detection signal, a conversion unit for generating detected bar code data based on the detection signal, an input interface unit receiving external bar code data generated externally, a data control unit for generating output bar code data by using the detected bar code data and/or the external bar code data from the input interface unit, and an output interface unit for sending out the output bar code data.

18 Claims, 16 Drawing Sheets

F I G. 6
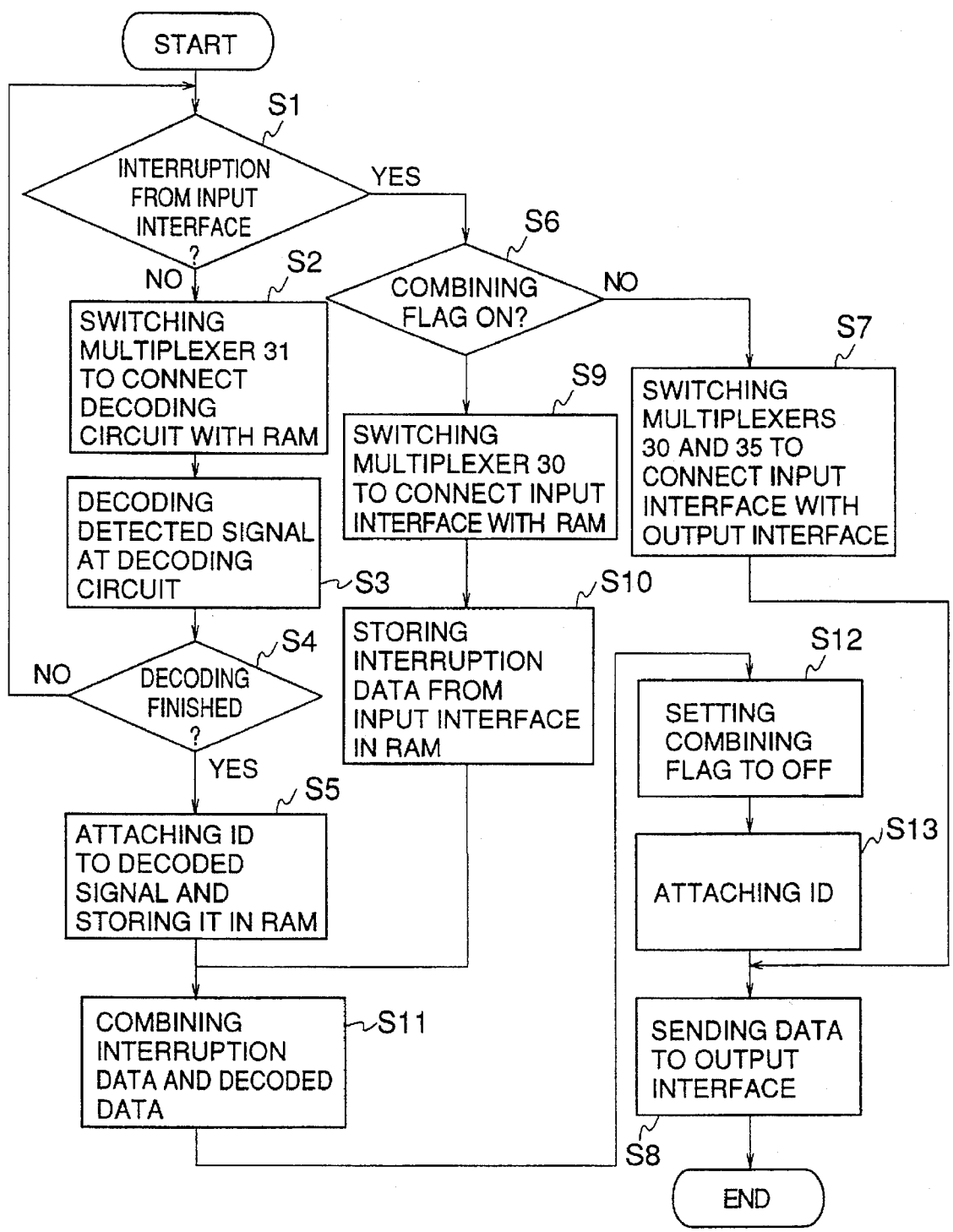

F I G. 7
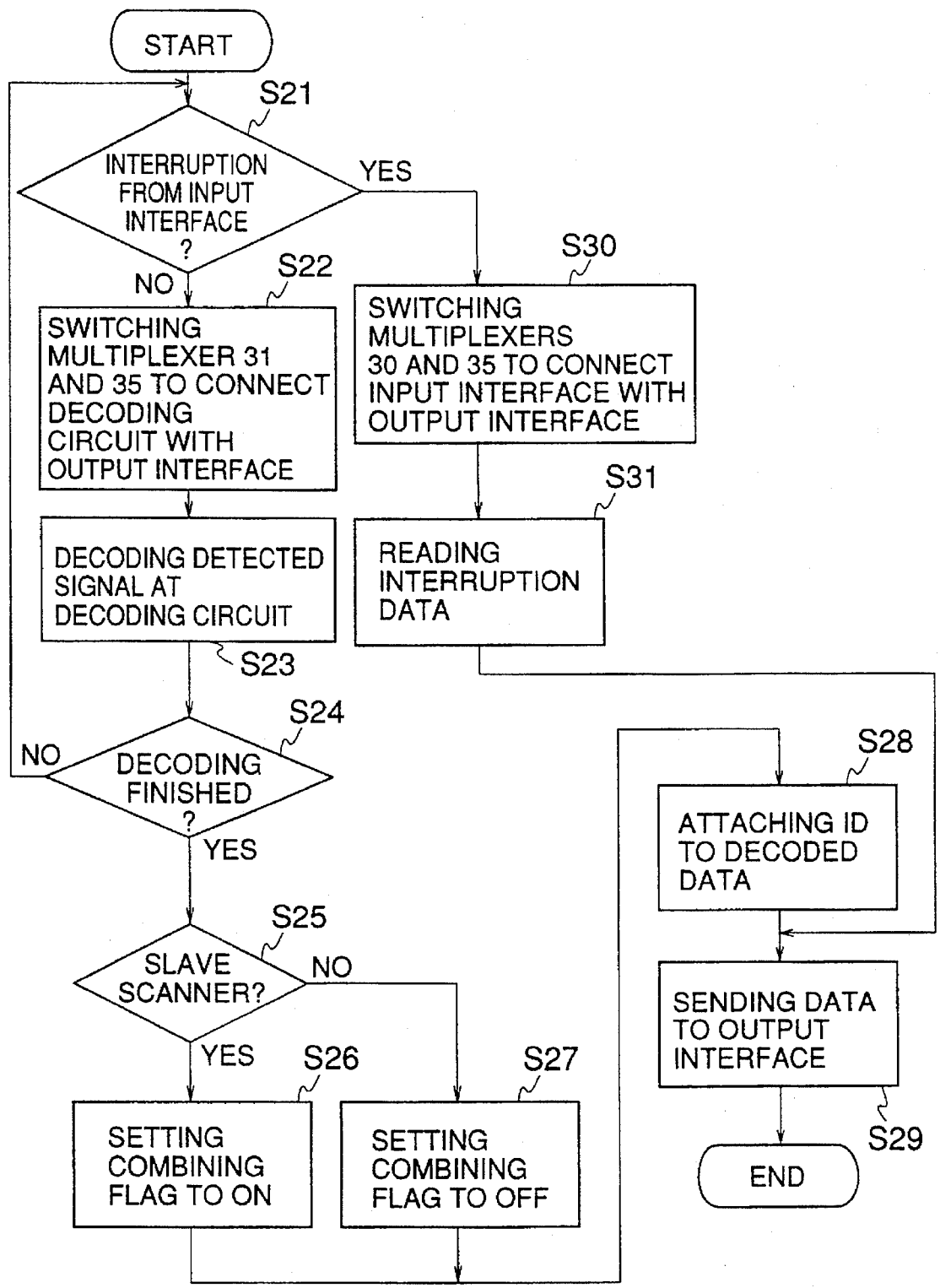

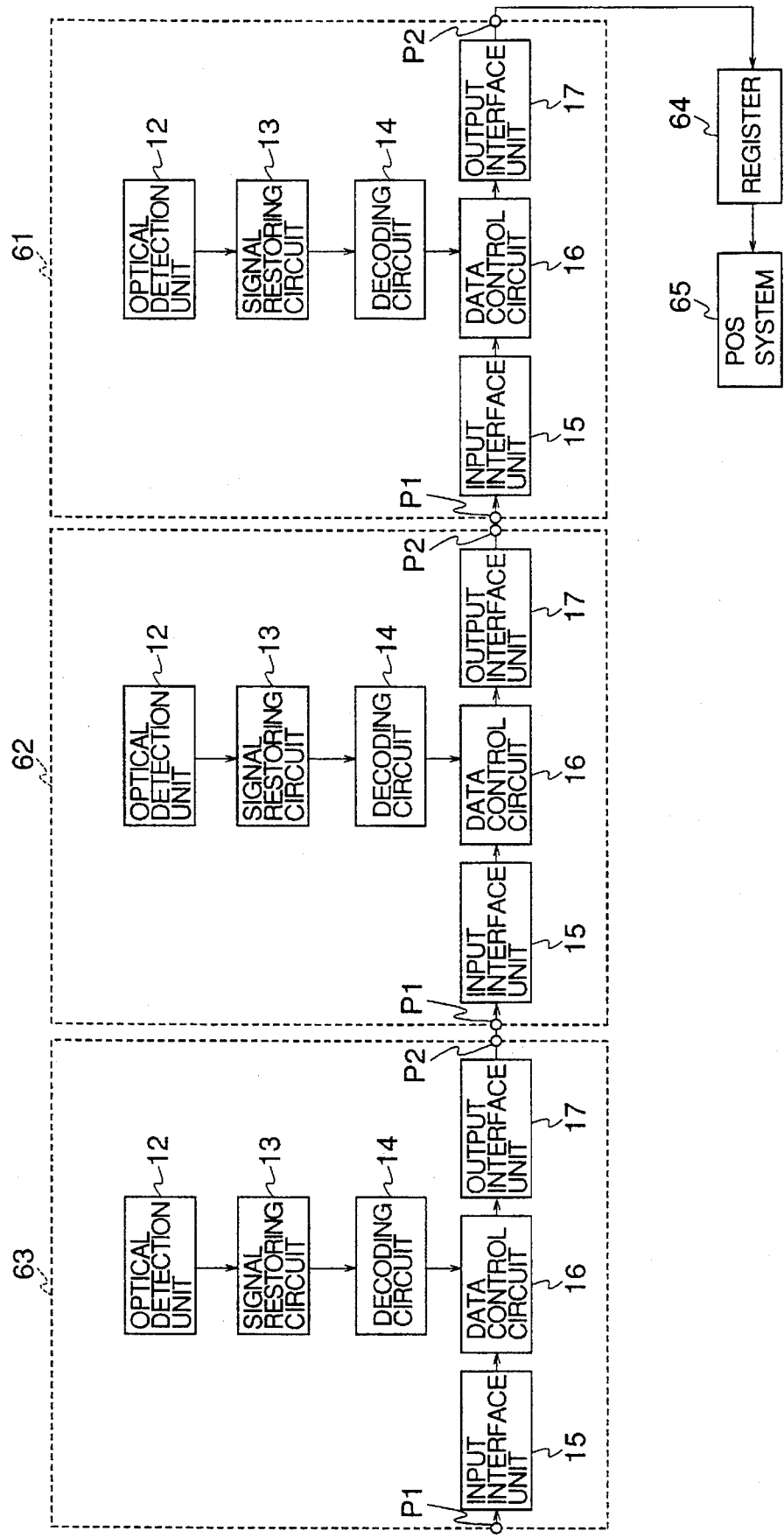

5,629,511

BAR CODE SCANNER AND SCANNING SYSTEM FOR VARIOUS TYPES OF OPERATIONS

BACKGROUND OF THE INVENTION

1. Field of the Invention

The present invention generally relates to bar code scanners and bar code scanning systems, and particularly relates to a bar code scanner and a bar code scanning system which read bar codes with a plurality of scanners.

One method for enhancing the performance of scanning a bar code is a multi-head control method. The multi-head control method reads a bar code of a product by scanning the bar code from a plurality of directions with a plurality of optical systems. With this method, an operator can use the bar code scanner without having to check positions of bar codes on products, which leads to an enhancement on the operator's performance.

In a typical configuration of a bar code system, a single bar code scanner is connected to a POS (Point Of Sales) system register. In recent years, however, there has been an increasing demand for a plurality of bar code scanners connected to a register, where one scanner is typically a hand scanner and the other is used as a fixed facility.

Including the example cited above, various types of operations are required in bar code scanning systems, and a versatile bar code system able to adapt to any type of operation is desired.

2. Description of the Prior Art

FIG. 1 shows a configuration of a bar code scanning system of the prior art. A bar code scanner 81 is a fixed facility which reads bar codes moving over a scan window by the use of laser light transmitted through a scan window 82. Bar code data read by the bar code scanner 81 is transferred to a register 83, where a price of goods can be displayed, and, also, transferred to a POS system, which carries out processes aiding sales management and product management.

This type of a bar code scanner in the prior art is usually used stand-alone. When a hand scanner needs to be connected, a second port interface for the connection is provided on the bar code scanner.

When realizing a bar code scanning system of a multi-head control method, a plurality of optical systems are planned to be installed in a single bar code scanner in order to scan laser beams in various directions.

However, such a configuration in which a plurality of optical systems are installed in a single scanner leads to only one type of beam scanning arrangement, so that a flexibility of operations is limited. Nor can the number of optical systems inside the scanner be adjusted in order to meet the demand for a greater operation volume or to adapt to different operation methods.

Furthermore, employing a multi-head control method requires a different scanner from that used for a conventional method. Also, a bar code scanner which can adjust the number of optional devices such as hand scanners connected thereto requires additional specifications. This means that it is difficult for a bar code scanner of the prior art to adapt to various types of operations.

Accordingly, there is a need in the field of bar code scanners for a bar code scanner and a bar code scanning system which can adapt to various types of operations.

SUMMARY OF THE INVENTION

Accordingly, it is a general object of the present invention to provide a bar code scanner and a bar code scanning system which can satisfy the need described above.

It is another and more specific object of the present invention to provide a bar code scanner and a bar code scanning system which can adapt to various types of operations.

In order to achieve the above objects, a bar code scanner according to the present invention includes a detection unit for detecting light reflected from a bar code and generating a detection signal, a conversion unit for generating detected bar code data based on the detection signal, an input interface unit receiving external bar code data generated externally, a data control unit for generating output bar code data by using the detected bar code data and/or the external bar code data from the input interface unit, and an output interface unit for sending out the output bar code data.

The bar code scanner according to the present invention is provided with the input interface unit for receiving external bar code data and with the data control means for generating the output bar code data based on the detected bar code data and/or the external bar code data. The external bar code data may be incomplete bar code data generated by another bar code scanner, and can be combined with the detected bar code data to generate a single complete bar code data. In this manner, a plurality of the bar code scanners can realize a multi-head scanner. On the other hand, the external bar code data may be complete bar code data, and such bar code data can be transferred through a plurality of cascaded bar code scanners. Here, the input interface unit of one bar code scanner is connected with the output interface unit of another bar code scanner. In this manner, a plurality of the bar code scanners can be connected to a single register. Accordingly, the bar code scanner of the present invention can be adapted to various types of operations.

Other objects and further features of the present invention will be apparent from the following detailed description when read in conjunction with the accompanying drawings.

BRIEF DESCRIPTION OF THE DRAWINGS

FIG. 6 is a flow chart of an operation of the data control circuit used as a master scanner in the master-slave configuration;

FIG. 7 is a flow chart of an operation of the data control circuit used as a slave scanner in the master-slave configuration or used in the main-second port configuration;

FIG. 13 is a block diagram of a third embodiment of the bar code scanning system;

DESCRIPTION OF THE PREFERRED EMBODIMENTS

First, a description of a principle of the present invention will be given with reference to FIG. 2.

Figure 1:
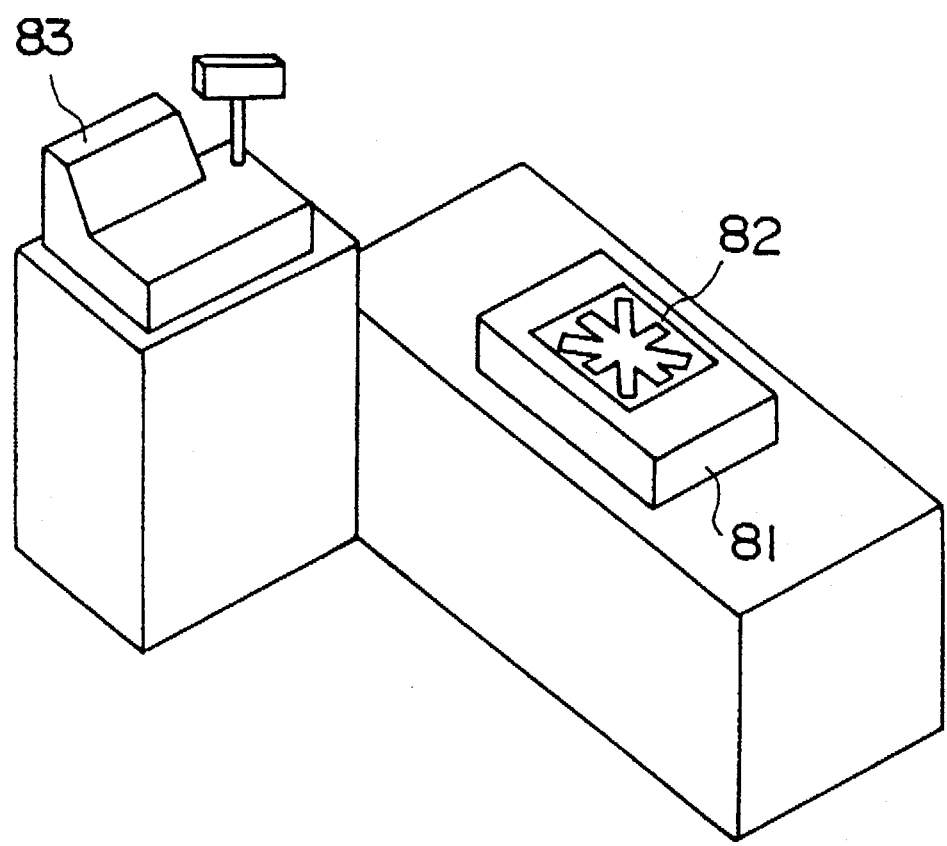
FIG. 1 is an isometric view of a bar code scanning system of the prior art including a bar code scanner.
Figure 2:
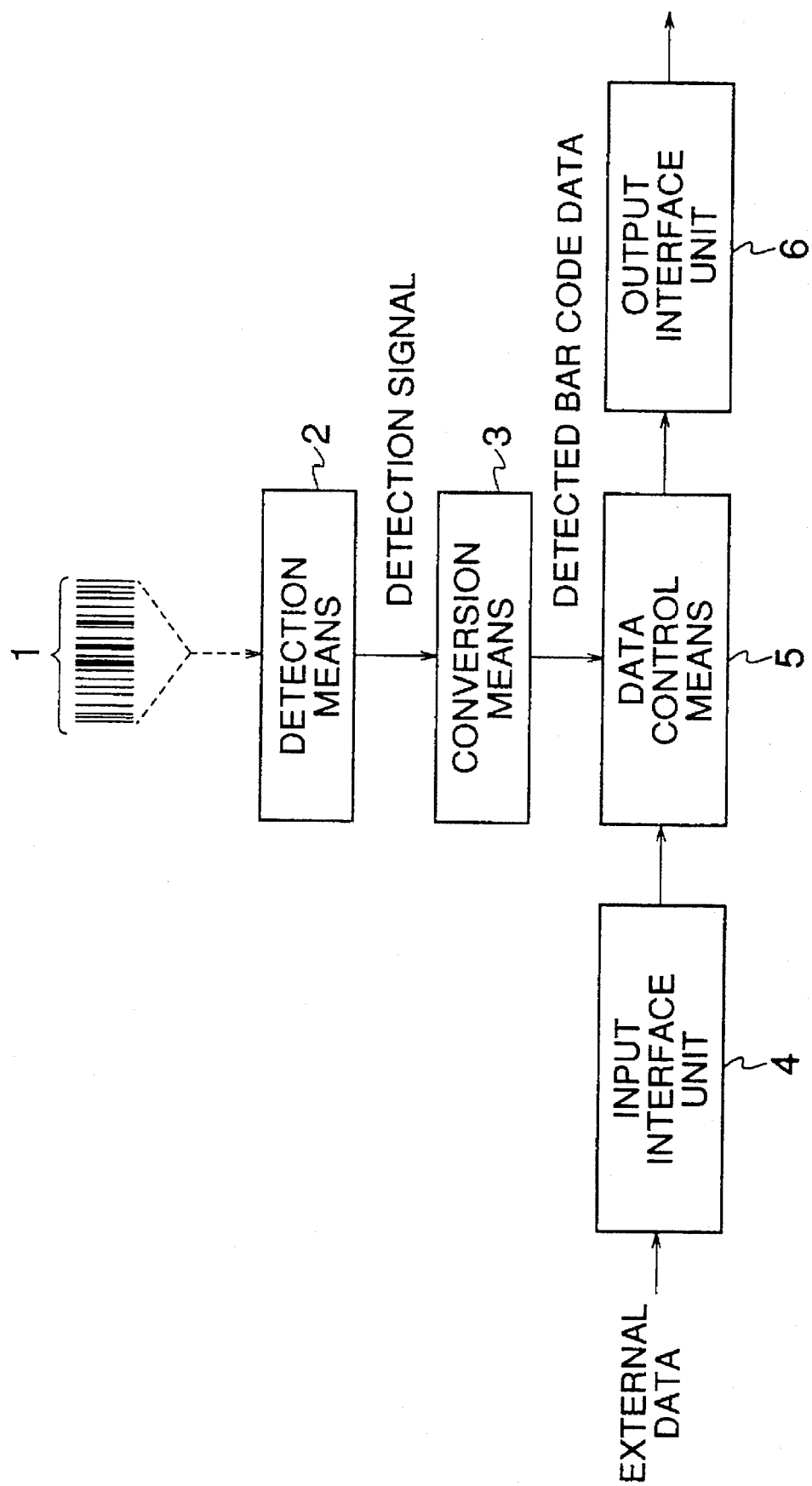
FIG. 2 is a block diagram of a principle of a bar code scanner according to the present invention.

FIG. 2 shows a block diagram of the principle of the present invention. Light illuminates a bar code 1, which in turn reflects the light. A detection means 2 detects the reflected light from the bar code 1, and generates a detection signal according to the reflected light.

A conversion means 3 generates detected bar code data for the bar code 1 on the basis of the detection signal from the detection means 2. An input interface unit 4 receives external bar code data generated externally.

A data control means 5 receives the detected bar code data from the conversion means 3 and the external bar code data from the input interface unit 4, and controls output bar code data by selecting one or the combination of the detected bar code data and the external bar code data.

An output interface unit 6 supplies the output bar code data generated by the data control means 5.

According to the principle of the present invention, the detected bar code data detected and generated by the detection means 2 and the conversion means 3, respectively, can be provided as an output, and, also, the external bar code data received by the input interface unit 4 can be provided as an output. Thus, not only the detected bar code data generated internally can be provided for a register through the output interface unit 6, but also the external bar code data can be provided for the register when another bar code scanner is connected to the input interface unit 4. This means that a register with a single input interface can be connected to a plurality of bar code scanners, and that the number of optical systems in a bar code scanner can be easily adjusted. Also, the detected bar code data generated internally can be supplied through the output interface unit 6 even if no scanner is attached to the input interface unit 4, so that the bar code scanner can be used stand-alone while having a characteristic of being adaptable to various types of operations.

In the following, a description of embodiments of the present invention will be given with reference to FIG. 3 to FIG. 17.

Figure 3:
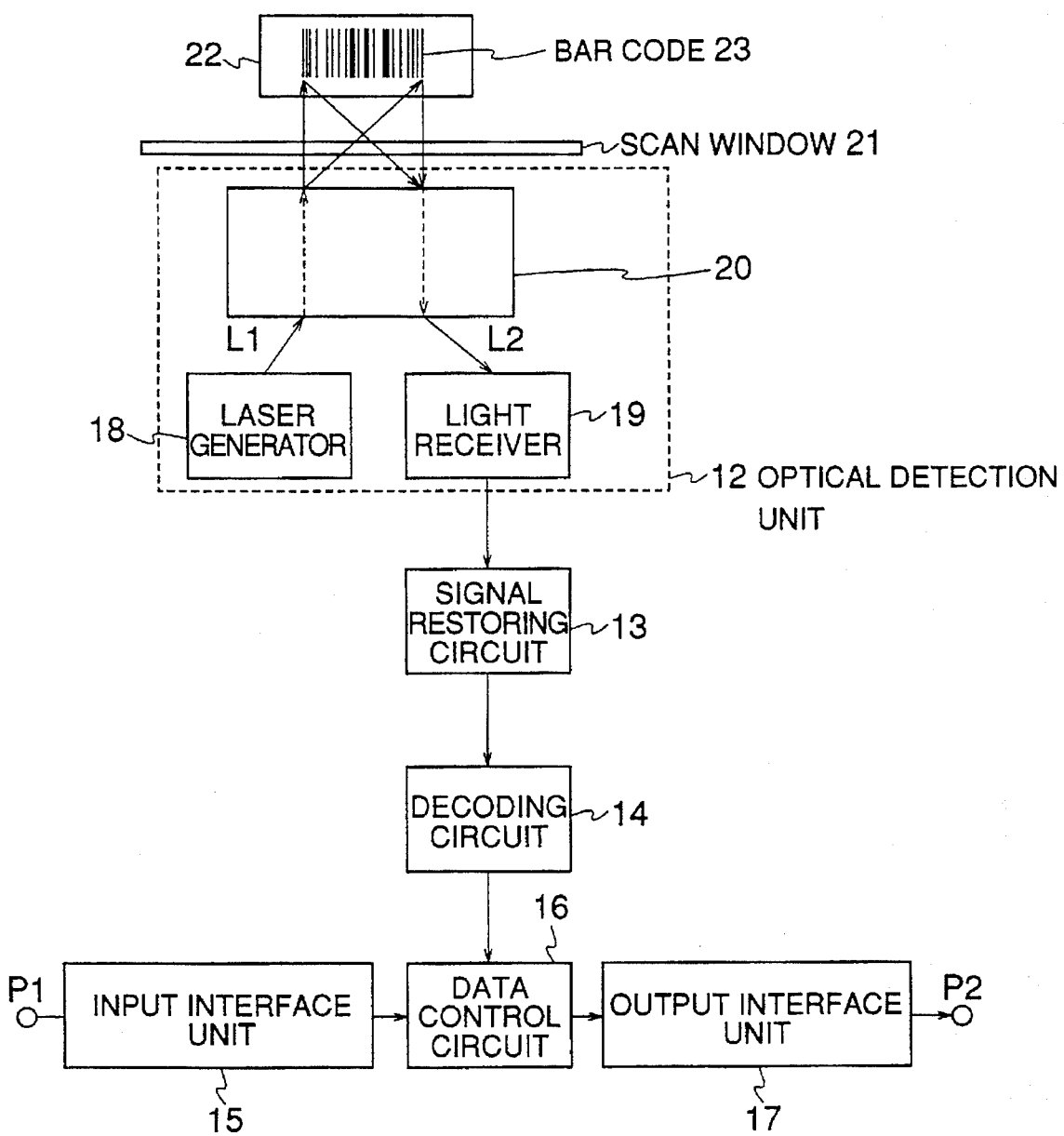
FIG. 3 is a block diagram of an embodiment of the bar code scanner of FIG. 3.

FIG. 3 shows a block diagram of an embodiment of a bar code scanner according to the present invention. A bar code scanner 11 comprises an optical detection unit 12 for optically reading a bar code, and a signal restoring circuit 13 for restoring a signal detected by the optical detection unit 12 in order to have a pulse signal representing the bar code. The bar code scanner 11 further comprises a decoding circuit 14 for decoding the detected pulse signal from the signal restoring circuit 13 in order to have digital data, and an input interface unit 15 for receiving digital data at an input port P1 which is generated externally. The bar code scanner 11 further comprises a data control circuit 16 for combining the decoded digital data from the decoding circuit 14 and the external digital data from the input interface unit 15, and an output interface unit 17 for supplying the combined data at an output port P2.

The optical detection unit 12 comprises a laser generator 18 for generating laser light, a light receiver 19 for detecting reflected light from the bar code, and an optical system 20 for scanning laser light generated by the laser generator 18 and for leading the reflected light from the bar code to the light receiver 19.

The laser generator 18 comprises such a generator as a He-Ne laser generator or semiconductor laser generator, and emits laser light L1. The laser light L1 emitted from the laser generator 18 is provided for the optical system 20.

The optical system 20 concentrates and scans the laser light L1, and projects the laser light L1 from a scan window 21. A product 22 with a bar code 23 is moved over the scan window 21 so that the bar code 23 passes over the scan window 21 in order for the bar code scanner 11 to read the bar code 23. When the bar code 23 passes over the scan window 21, the laser light L1 illuminates the bar code 23 through the scan window 21.

The amount of the laser light L1 reflected corresponds to the black and white bars of the bar code 23, and is supplied back to the optical system 20 through the scan window 21. The optical system 20 provides reflected light L2 for the light receiver 19.

The light receiver 19 comprises a Pin photodiode or a phototransistor, for example. An internal impedance of the light receiver 19 is changed according to the amount of the reflected light L2 from the bar code 23, and a predetermined voltage level applied to the light receiver 19 provides an electric signal with a varying electric current corresponding to the amount of the reflected light L2. The electric signal generated by the light receiver 19 is then supplied to the signal restoring circuit 13.

The signal restoring circuit 13 comprising a comparator compares the supplied electric signal with a reference voltage level, and generates a pulse signal having a high or low level according to the result of the comparison. The pulse signal restored at the signal restoring circuit 13 is supplied to the decoding circuit 14.

Figure 4:
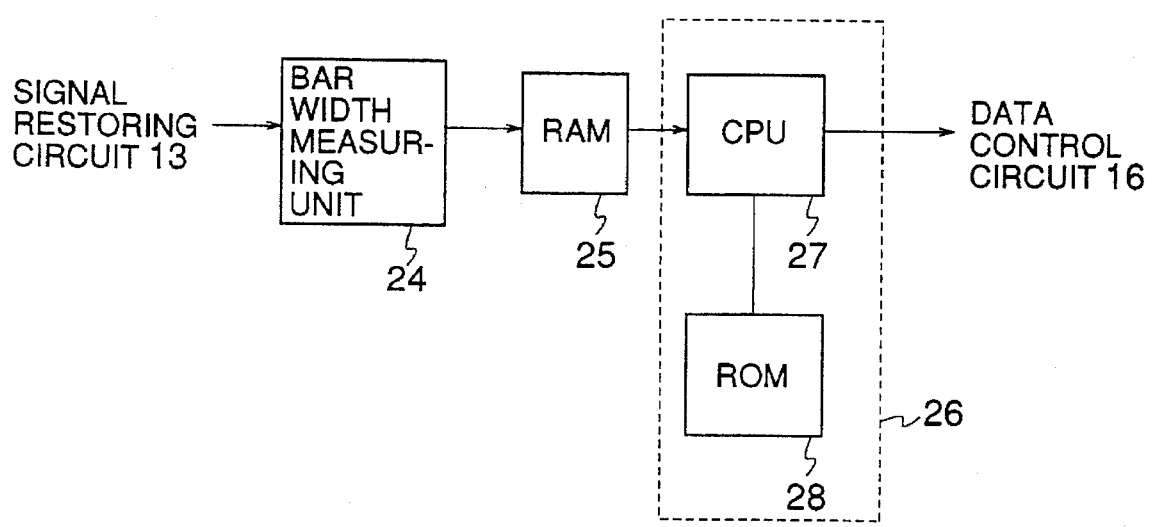
FIG. 4 is a block diagram of the decoding circuit of FIG. 3.

FIG. 4 shows a block diagram of the decoding circuit 14. The decoding circuit 14 comprises a bar width measuring unit 24 which measures the bar widths of the bar code 23 on the basis of the pulse widths of the pulse signal provided from the signal restoring circuit 13 by using a predetermined clock. The bar width measuring unit 24 then converts the measured pulse widths into numerical data. The decoding circuit 14 further comprises a memory unit 25 for storing the numerical data representing the bar widths measured by the bar width measuring unit 24, and an operation unit 26 for generating bar code data corresponding to the bar code 23 on the basis of data consecutively read from the memory unit 25.

The bar width measuring unit 24 comprises a counter, and, by using a predetermined clock, measures the duration of the high level or the low level appearing in the pulse signal in accordance with the bar widths. Thus, the bar width measuring unit 24 obtains numerical data representing the duration of high levels or low levels. This bar width data measured by the bar width measuring unit 24 is stored in the memory unit 25. The memory unit 25 comprises a FIFO (First In First Out) memory which first provides as an output the oldest data stored therein, and stores and provides the bar width data in an order of the bar arrangement of the bar code 23. The bar width data provided by the memory unit 25 is supplied to the operation unit 26.

The operation unit 26 comprises a CPU 27 for reconstructing characters on the basis of the bar width data from the memory unit 25, and a ROM 28 for storing programs controlling the CPU 27.

The CPU 27 reads from the ROM 28 characters and numbers corresponding to the pattern of the bar width data from the memory unit 25, and reconstructs a sequence of characters and numbers which is represented by the bar code 23. The sequence of characters and numbers are then supplied to the data control circuit 16 as decoded bar code data.

Figure 5:
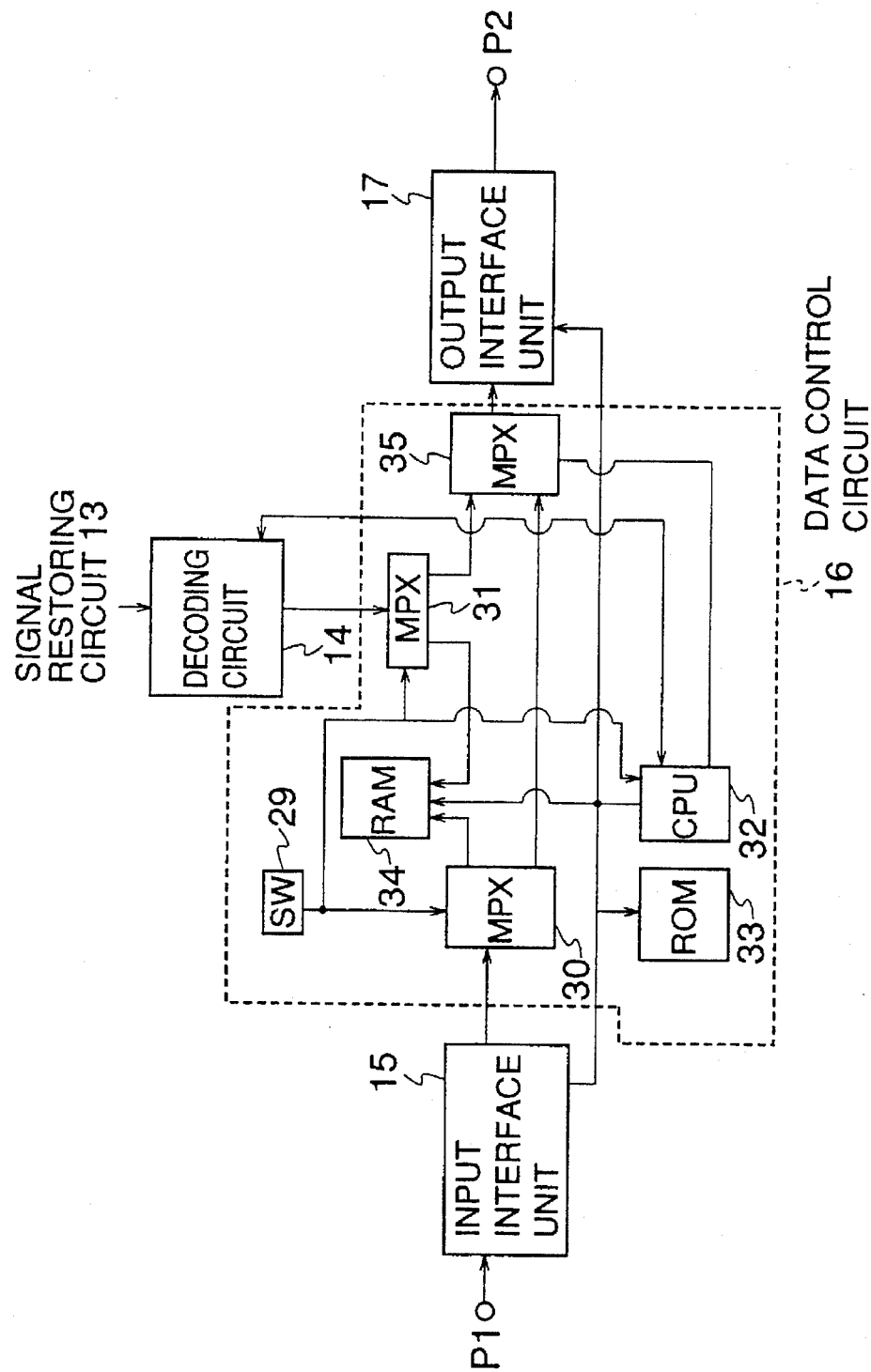
FIG. 5 is a block diagram of the data control circuit of FIG. 3.

FIG. 5 shows a block diagram of a major part of the present invention, including details of the data control circuit 16. The input interface unit 15 is connected to the input port P1 which receives a modulated signal transmitted from an external source. The input interface unit 15 demodulates the modulated signal, and, then, provides a demodulated signal for the data control circuit 16.

The data control circuit 16 comprises a switch 29 for switching between different modes, multiplexers 30 and 31 for switching the data destination according to the state of the switch 29, a CPU 32 for carrying out a data combining process and various controls, a ROM 33 for storing programs controlling the CPU 32, a RAM 34 for storing data to be processed, and a multiplexer 35 for controlling a data output.

The switch 29 provides switch data for the multiplexers 30 and 31 and the CPU 32. The multiplexer 30 receives the external data from the input interface unit 15, and transfers the external data to either the RAM 34 or the multiplexer 35 according to the switch data provided by the switch 29. The multiplexer 31 receives the decoded data from the decoding circuit 14, and transfers the decoded data to either the RAM 34 or the multiplexer 35 according to the switch data provided by the switch 29.

The CPU 32 carries out processing of various processing modes on the basis of the switch data from the switch 29, and provides control signals for the input interface unit 15, the RAM 34, the output interface unit 17, and the multiplexer 35 in order to control an input/output timing and so forth.

The CPU 32 reads control programs from the ROM 33 and process data from the RAM 34. Then, the CPU 32 carries out a data combining process on data from the RAM 34 in accordance with the control programs provided from the ROM 33.

The multiplexer 35 is controlled by the CPU 32, and provides an output for the output interface unit 17 by switching the output between the external data from the multiplexer 30 and the encoded data from the multiplexer 31.

FIG. 6 and FIG. 7 show flow charts of operations of the data control circuit 16. The bar code scanner 11 of the present invention is used in two different configurations. In one configuration, a master scanner and one or more slave scanners read the same bar code, and data from those scanners are combined together to produce a single bar code data. Here, the bar code scanner 11 can be used as either a master scanner or a slave scanner. In the other configuration, a main scanner and more than one second port scanners read respective bar codes, and provide respective bar code data as outputs. Here, the bar code scanner 11 can be used as either a main scanner or a second scanner. Operations for these two different configurations can be selected by the switching operation of the switch 29.

With reference to FIG. 6, a description will be given of an operation of the bar code scanner used as a master scanner for creating a single bar code data from data generated by the master scanner and data generated by a slave scanner.

When the bar code scanner 11 is used as a master scanner, the input port P1 of the bar code scanner 11 is connected to the slave scanner, and the output port P2 is connected to a register and the like. The multiplexers 30 and 31 are controlled by the switch 29 so that the multiplexer 30 provides the RAM 34 with the external data from the input interface unit 15, and the multiplexer 31 provides the RAM 34 with the decoded data from the decoding circuit 14.

First, when data is supplied to the input port P1 from the slave scanner, the input interface unit 15 provides an interruption signal for the CPU 32.

At a step S1, the CPU 32 checks whether there is an interruption signal from the input interface unit 15. If there is no interruption signal from the input interface unit 15, the procedure goes to a step S2.

At the step S2, the multiplexer 31 is switched so as to provide the RAM 34 with the decoded signal from the decoding circuit 14. At a step S3, the decoding circuit 14 decodes the detection signal. At a step S4, a check is made whether the decoding process is finished. If it is finished, at a step S5, the decoded data is provided with the master scanner's own ID, and is stored in the RAM 34. If it is not finished, the procedure goes back to the step S1 to repeat the same steps. Here, the ID includes a combining flag which indicates whether the data needs to be combined. When the bar code scanner is used as a slave scanner as will be described later, the combining flag is set to on, i.e., indicating that the data needs to be combined.

At the step S1 again, if there is an interruption signal from the input interface 15, the procedure goes to a step S6.

At the step S6, the CPU 32 checks whether the combining flag is on or off. If the combining flag of interruption data is off, the procedure goes to a step S7. At the step S7, the multiplexers 30 and 35 are switched so as to provide the output interface unit 17 with the data from the input interface unit 15, since the data does not need to be combined. At a step S8, thus, the data from the input interface unit 15 is provided for the output interface unit 17. If the combining flag of the interruption data is on, the procedure goes to a step S9. At the step S9, the multiplexer 30 is switched so as to provide the RAM 34 with the data from the input interface unit 15. At a step S10, thus, the interruption data from the input interface unit 15 which is bar code data generated by the slave scanner and has the slave scanner's ID is stored in the RAM 34.

At a step S11, a single bar code data is generated by combining the decoded data stored in the RAM 34 at the step S5 with the interruption data stored in the RAM 34 at the step S10.

At a step S12, the combining flag of the master scanner's ID is set to off. At a step S13, the combined data is provided with the master scanner's ID. At the step S8, the combined data having the ID is provided for the output interface unit 17.

A method of combining two data will be explained below. The two data which are combined are data generated by the slave scanner and data generated by the master scanner, both data being stored in the RAM 34.

Bar code data generally has a start code indicating a start point of the data, an end code indicating an end point of the data (e.g., guard bars of a UPC bar code), and a middle code between the start code and the end code. The combining of data is carried out based on those codes.

When data generated by the master scanner and data generated by the slave scanner are stored in the RAM 34, a check is made whether both the start code and the end code are in the data generated by the master scanner. If both of the codes exist, this means that the master scanner by itself can provide complete bar code data, so that the bar code data generated by the master scanner along with the ID is provided for the output interface unit 17.

If neither the start code nor the end code exist in the data generated by the master scanner, a check is made whether both of the codes are in the data provided from the slave scanner. If both of the codes cannot be detected in the data from the slave scanner, this means that complete bar code data cannot be created, so that data indicating an error along with the master scanner's ID is sent to the output interface unit 17. If both of the codes are detected in the data from the slave scanner, this means that the slave scanner's data is complete, so that the slave scanner's data along with the master scanner's ID is sent to the output interface unit 17.

If either the start code or the end code exists in the data of the master scanner, the data is divided in half. The former half will be used when the start code exists in the data of the master scanner, and the latter half will be used when the end code exists in the data of the master scanner. When dividing the data into halves, the dividing line is drawn in the middle code, for example. Then, a check is made whether the other code exists in the data provided by the slave scanner. That is, when only the start code exists in the master scanner's data, the end code is sought in the slave scanner's data. On the other hand, when only the end code exists in the master scanner's data, the start code is sought in the slave scanner's data. If the other code does not exist in the slave scanner's data, this means that complete data cannot be created by combining the two data, so that data indicating an error along with the master scanner's ID is sent to the output interface unit 17.

If the other code exists in the slave scanner's data, complete data can be created. When the start code and the end code exist in the master scanner's data and the slave scanner's data, respectively, the former half of the master scanner's data is combined with the latter half of the slave scanner's data at the middle code. When the end code and the start code exist in the master scanner's data and the slave scanner's data, respectively, the latter half of the master scanner's data is combined with the former half of the slave scanner's data at the middle code. Then, the combined data along with the master scanner's ID is sent to the output interface unit 17. Here, the combining flag included in the master scanner's ID is set to off.

FIG. 7 shows a flow chart of an operation of the bar code scanner 11 used as a slave scanner in the master-slave configuration, or a main scanner or a second port scanner in the main-second port configuration.

For use as one of the above three scanners, the switch 29 of the bar code scanner 11 is set in such a position that the outputs of the multiplexer 30 and 31 are both provided for the multiplexer 35.

At a step S21, a check is made whether there is an interruption from the input interface unit 15. If there is no interruption, the procedure goes to a step S22.

At the step S22, the multiplexers 31 and 35 are switched so as to provide the output interface unit 17 with the decoded signal from the decoding circuit 14. At a step S23, the decoding circuit 14 decodes the detection signal. At a step S24, a check is made whether the decoding process is finished. If it is finished, at a step S25, a check is made whether the bar code scanner is being used as a slave scanner or a scanner used in the main-second port configuration. If it is a slave scanner, at a step S26, the combining flag of an ID is set to on. If it is a scanner used in the main-second port configuration, at a step S27, the combining flag of the ID is set to off. At a step S28, the scanner's own ID is attached to the decoded data at the decoding circuit 14. At a step S29, the decoded data is sent from the decoding circuit 14 to the output interface unit 17. Then, the output interface unit 17 modulates the supplied data in order to transmit it, and sends it to a master device or another slave device.

At the step S21 again, if there is an interruption from the input interface unit 15, the procedure proceeds to a step S30. At the step S30, the CPU 32 switches the multiplexers 30 and 35 so as to connect the input interface unit 15 with the output interface unit 17. At a step S31, the CPU 32 reads the interruption data. At the step S29 again, the interruption data demodulated at the input interface unit 15 is sent to the output interface unit 17. Then, the output interface unit 17 modulates the supplied data, and transmits it from the output port P2.

Figure 8:
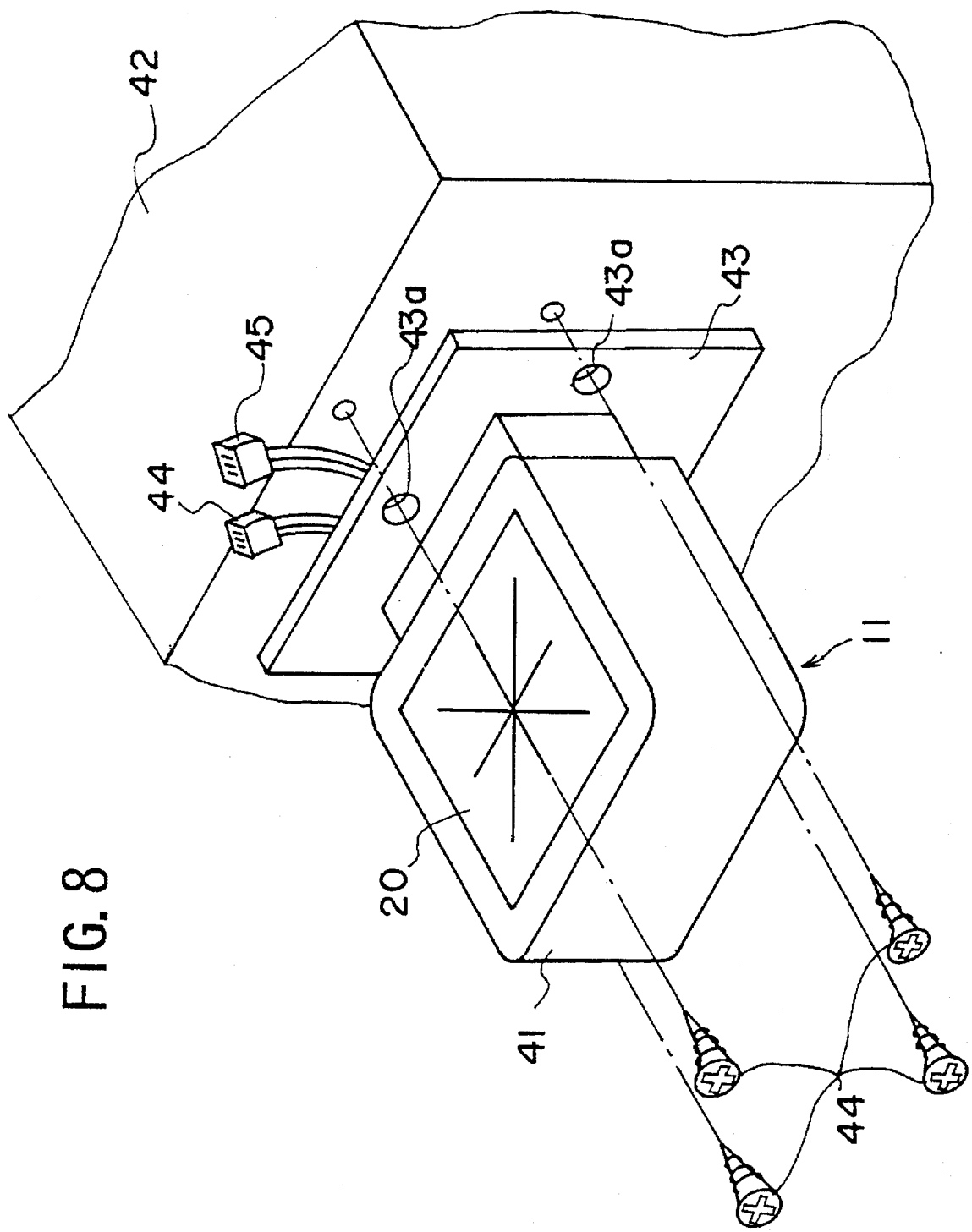
FIG. 8 is an isometric view of a first embodiment of a bar code scanning system according to the present invention.

FIG. 8 shows an isometric view of the embodiment of the bar code scanner 11 according to the present invention.

The bar code scanner 11 comprises a scan window 20, a container part 41 for containing electronic devices such as various ICs carrying out the processes described above, and a fixing part 43 for fixing the bar code scanner 11 to a register body 42 and the like.

A hole is formed at the bottom of the fixing part 43, and is connected with the inside of the container part 41. Through the hole, connectors 44 and 45 are extended from the inside, which serve as an input port P1 and an output port P2, respectively. The connectors 44 and 45 are connected to another bar code scanner or a register, for example, by being extended from the hole to the back of the register body 42.

The bar code scanner 11 is fixed to the register body 42 by fastening screws 44 on the register body 42 through screw holes 43a provided in the fixing part 43.

In this manner, the bar code scanner 11 can be fixed easily and freely to the register body 42 and the like.

Figure 9:
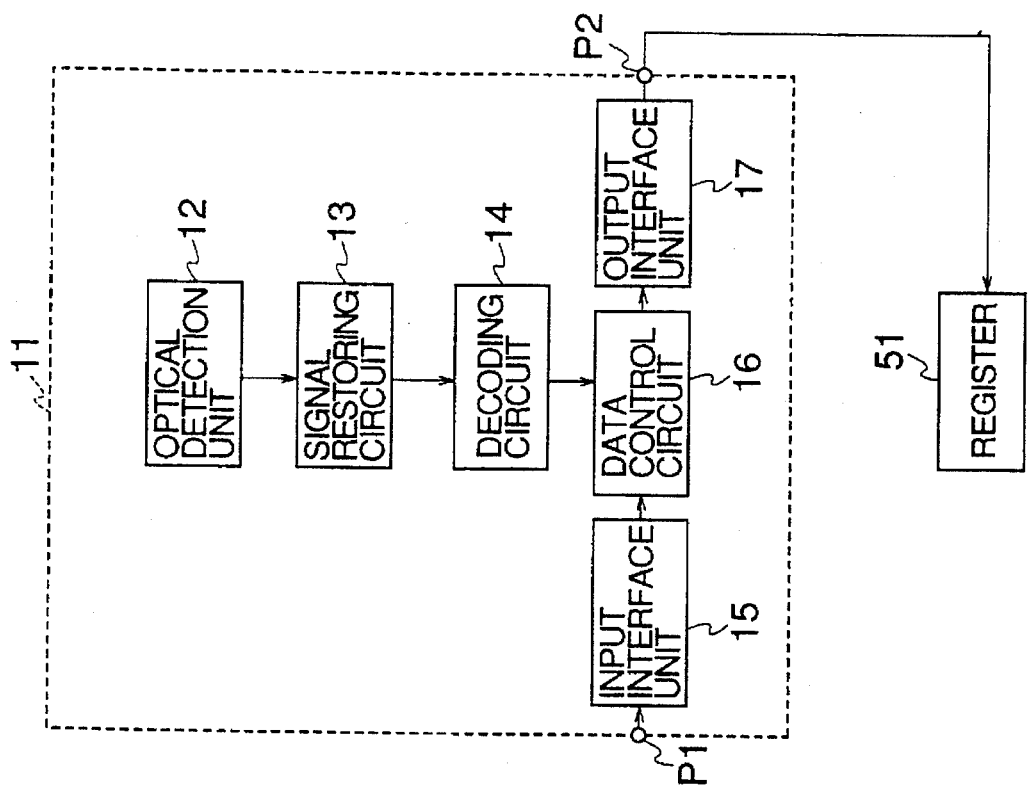
FIG. 9 is a block diagram of the first embodiment of the bar code scanning system.

FIG. 9 shows a block diagram of the first embodiment of a bar code scanning system of the present invention.

In the first embodiment of the bar code scanning system, the bar code scanner 11 is used stand-alone by leaving the input port P1 open and connecting the output port P2 with a register 51. The switch 29 of the bar code scanner 11 can be set to any mode of a master scanner, a slave scanner, a main scanner, or a second port scanner. Only the bar code data generated by the bar code scanner 11 is provided for the register 51.

In this manner, the bar code scanner 11 can be used stand-alone.

Figure 10:
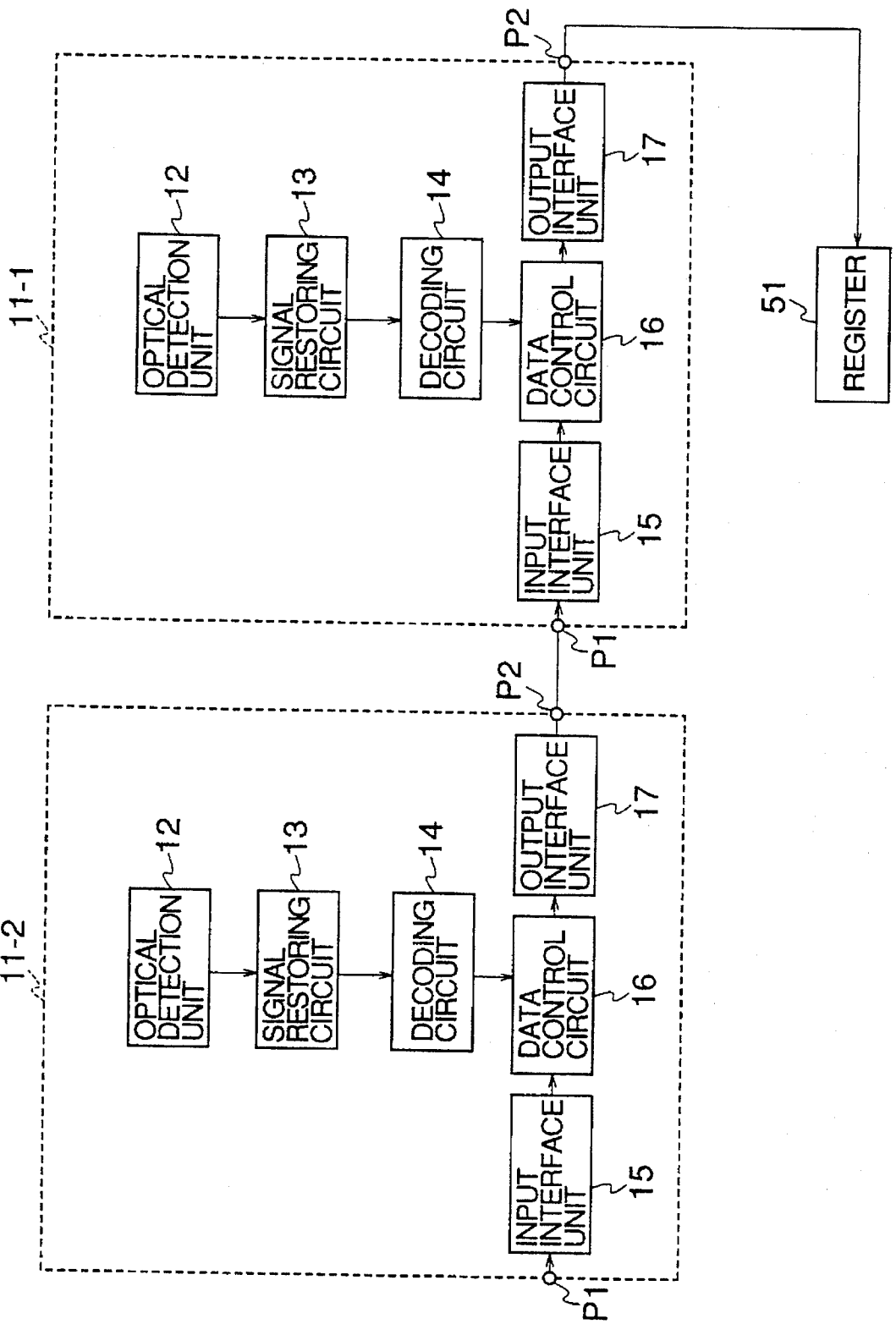
FIG. 10 is a block diagram of a second embodiment of the bar code scanning system.

FIG. 10 shows a block diagram of a second embodiment of a bar code scanning system of the present invention. In this second embodiment, two bar code scanners 11 are used for constructing a bar code scanning system of the master-slave configuration with multi-head scanning.

A bar code scanner 11-1 is a master scanner in which the switch 29 is set to a mode of a master scanner, the input port P1 is connected with a bar code scanner 11-2, and the output port P2 is connected with the register 51. A bar code scanner 11-2 is a slave scanner in which the switch is set to a mode of a slave scanner.

Figure 11:
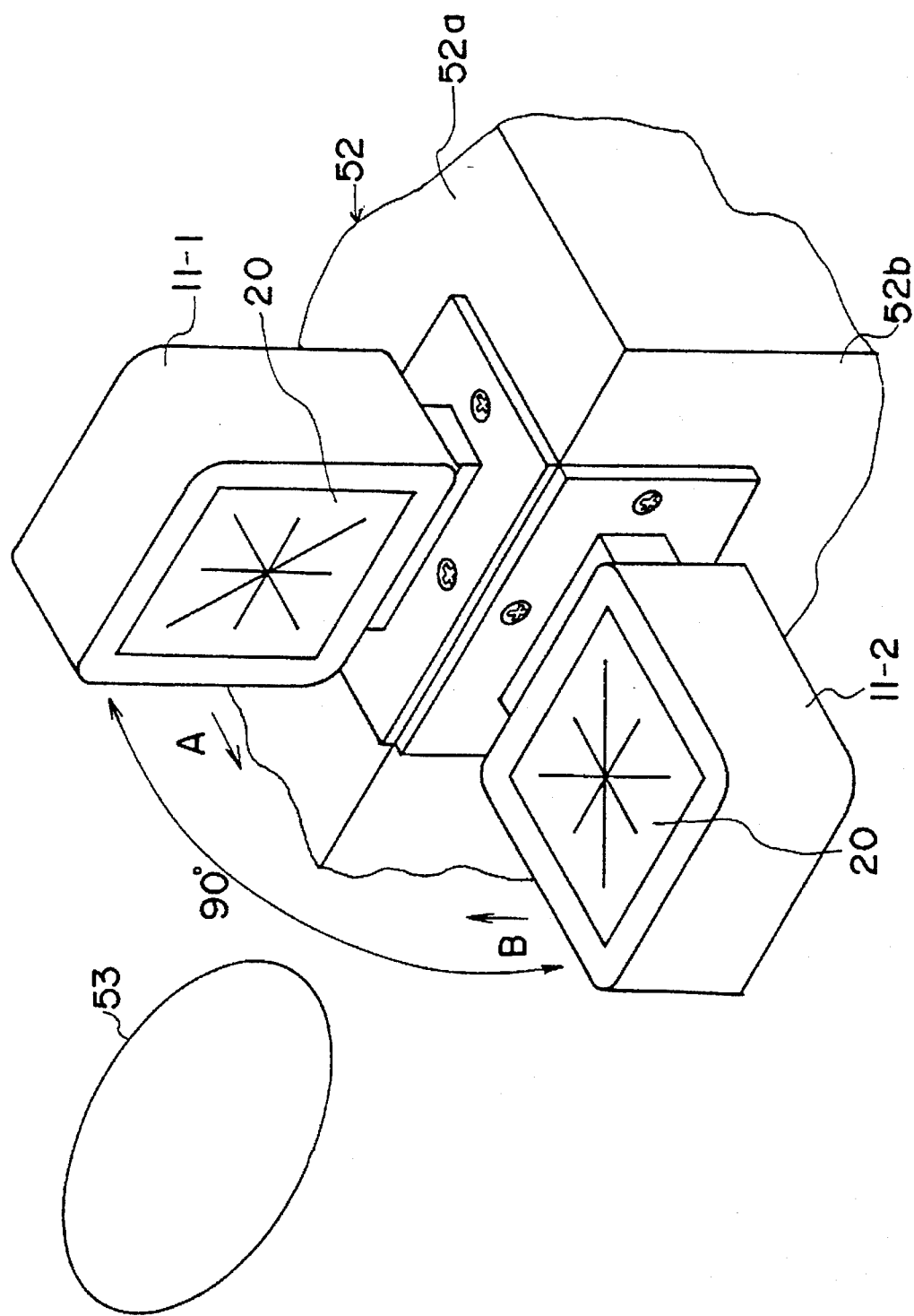
FIG. 11 is an isometric view of the second embodiment.

FIG. 11 shows an isometric view of the second embodiment of the bar code scanning system. The bar code scanner 11-1 is fixed on one side of an upper surface 52a of the register body 52 with its scan window 20 facing to one side (direction A). The bar code scanner 11-2 is fixed on the upper side of a side surface 52b of the register body 52 with its scan window 20 facing up (direction B).

In this manner, the scan windows 20 of the bar code scanners 11-1 and 11-2 are arranged orthogonally to each other. As described above, the bar code scanner 11-1 serves as a master scanner, and the bar code scanner 11-2 serves as a slave scanner. Data read by the bar code scanners 11-1 and 11-2 are combined to become one bar code data, which is then supplied to the register 51.

According to the second embodiment, the bar code scanners 11-1 and 11-2 can supplement each other in reading a bar code in order to generate correct bar code data. Thus, a bar code on a product 53 is only required to be directed within a range of 90 degrees defined by the scan windows 20 in order to correctly read the bar code.

Figure 12A:
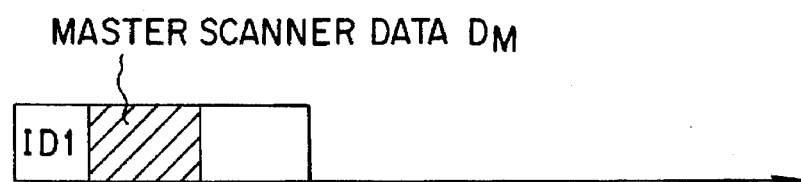
FIG. 12 is a time chart showing the combining of data from the master scanner with data from the slave scanner of FIG. 10.
Figure 12B:
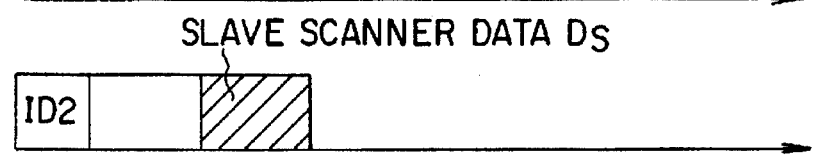
Figure 12C:
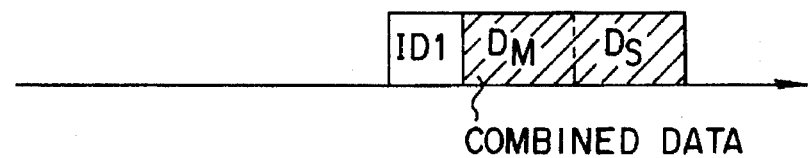

FIG. 12 shows a time chart showing an operation of the second embodiment. FIG. 12 shows the case where half of the bar code is read through the scan window 20 of the bar code scanner 11-1 and the other half is read through the scan window 20 of the bar code scanner 11-2.

As shown at the middle of FIG. 12, the bar code scanner 11-2 serving as a slave scanner generates incomplete bar code data, and attaches to the data the ID having a combining flag set to on. As described above, the combining flag set to on means that the data should be combined. This incomplete bar code data with the ID attached thereto is then sent to the bar code scanner 11-1.

As shown at the top of FIG. 12, the bar code scanner 11-1 serving as a master scanner also generates incomplete bar code data which can supplement the data provided by the bar code scanner 11-2 in order to have complete data.

As shown at the bottom of FIG. 12, the data control circuit 16 of the bar code scanner 11-1 combines the bar code data from the bar code scanner 11-2 with the bar code data from the bar code scanner 11-1 so as to generate a single complete bar code data.

As described above, a bar code can be correctly read by directing the bar code within a range of 90 degrees, so that a bar code provided on a cylindrical surface or a side edge of a product can be correctly processed. Also, there is no need to pay an excessive attention to the positioning of a bar code, which leads to efficient handling of products having bar codes to be read.

Figure 14:
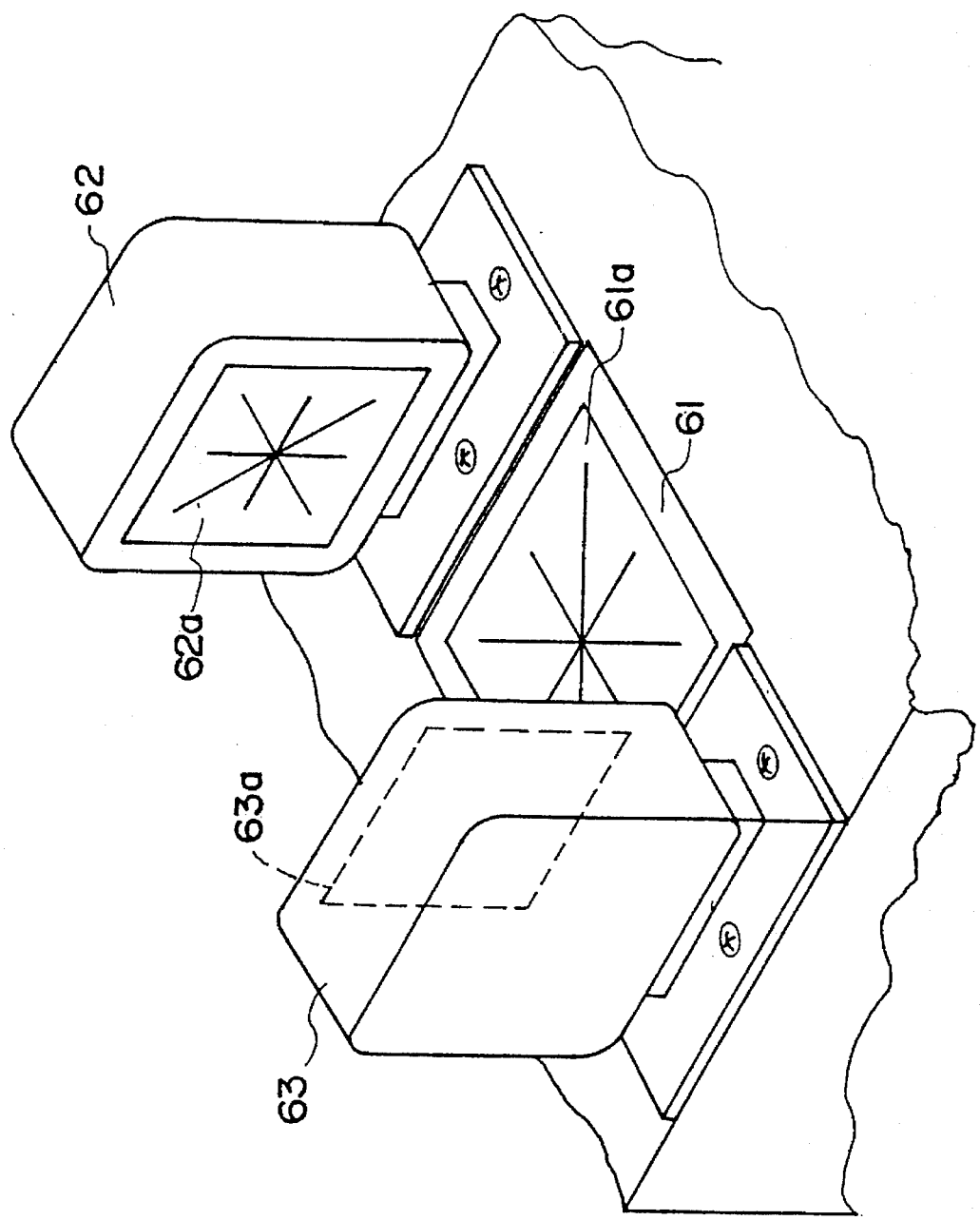
FIG. 14 is an isometric view of the third embodiment.

FIG. 13 and FIG. 14 show a block diagram and an isometric view, respectively, of a third embodiment of a bar code scanning system according to the present invention. In FIG. 13 and FIG. 14, the same elements as those of FIG. 3 are referred to by the same numerals, and will not be further described.

In the third embodiment, a bar code scanner 61, which has a circuit structure identical to that of the bar code scanner 11 but has a body of a fixed type, is provided on one side with a bar code scanner 62 and on the other side with a bar code scanner 63. The bar code scanner 61 may be used as a master scanner, and the bar code scanners 62 and 63 may be used as slave scanners, for example.

With regard to the bar code scanner 61, the input port P1 is connected to the output port P2 of the bar code scanner 62, and the output port P2 is connected to a register 64 and thence to a POS system 65. The input port P1 of the bar code scanner 62 is connected to the output port P2 of the bar code scanner 63. Scan windows 61a, 62a, and 63a are arranged such that the scan windows 62a and 63a are facing each other while the scan window 61a is positioned orthogonally to and between the other two. In this arrangement, there is an opening to the top. The bar code scanner 61 stores data read by the bar code scanners 62 and 63 as the slave scanner's data, and carries out a combining process described above so as to combine this data with data generated inside. Here, the bar code scanners 62 and 63 serving as slave scanners are positioned, facing each other, on both sides of the bar code scanner 61. Thus, a bar code can be read by a combination of the bar code scanners 61 and 62 or a combination of the bar code scanners 61 and 63, so that there is no need to combine data from the bar code scanner 62 with data from the bar code scanner 63.

According to the third embodiment, a bar code can be read from three sides, so that the effective range for reading a bar code can be as wide as 180 degrees. This means that the third embodiment can be more efficient in reading bar codes than the second embodiment. Also, a bar code provided on a curved surface can be read from each of the three directions, and each data can be combined to ensure complete data is provided.

Figure 15:
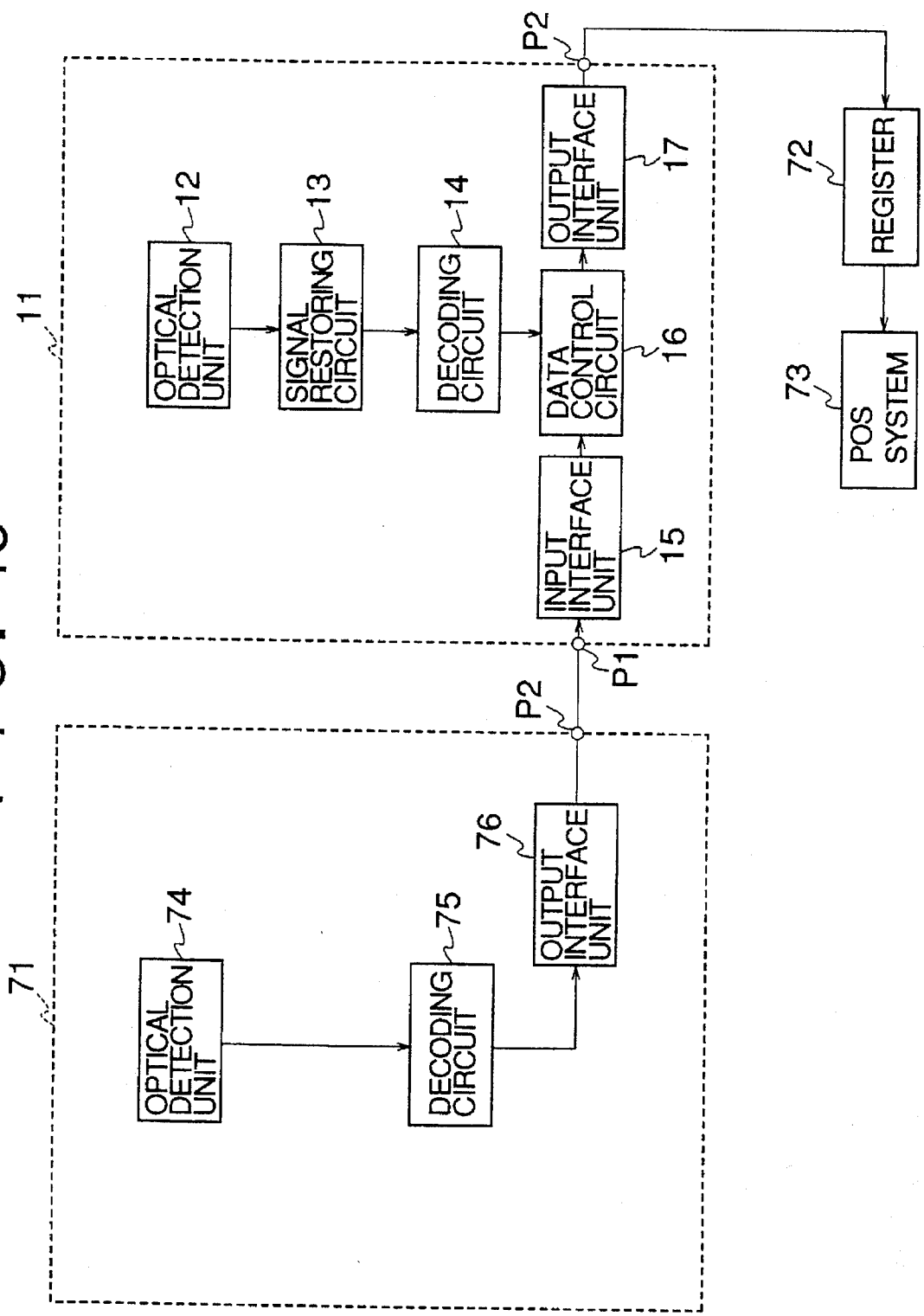
FIG. 15 is a block diagram of a fourth embodiment of the bar code scanning system.
Figure 16:
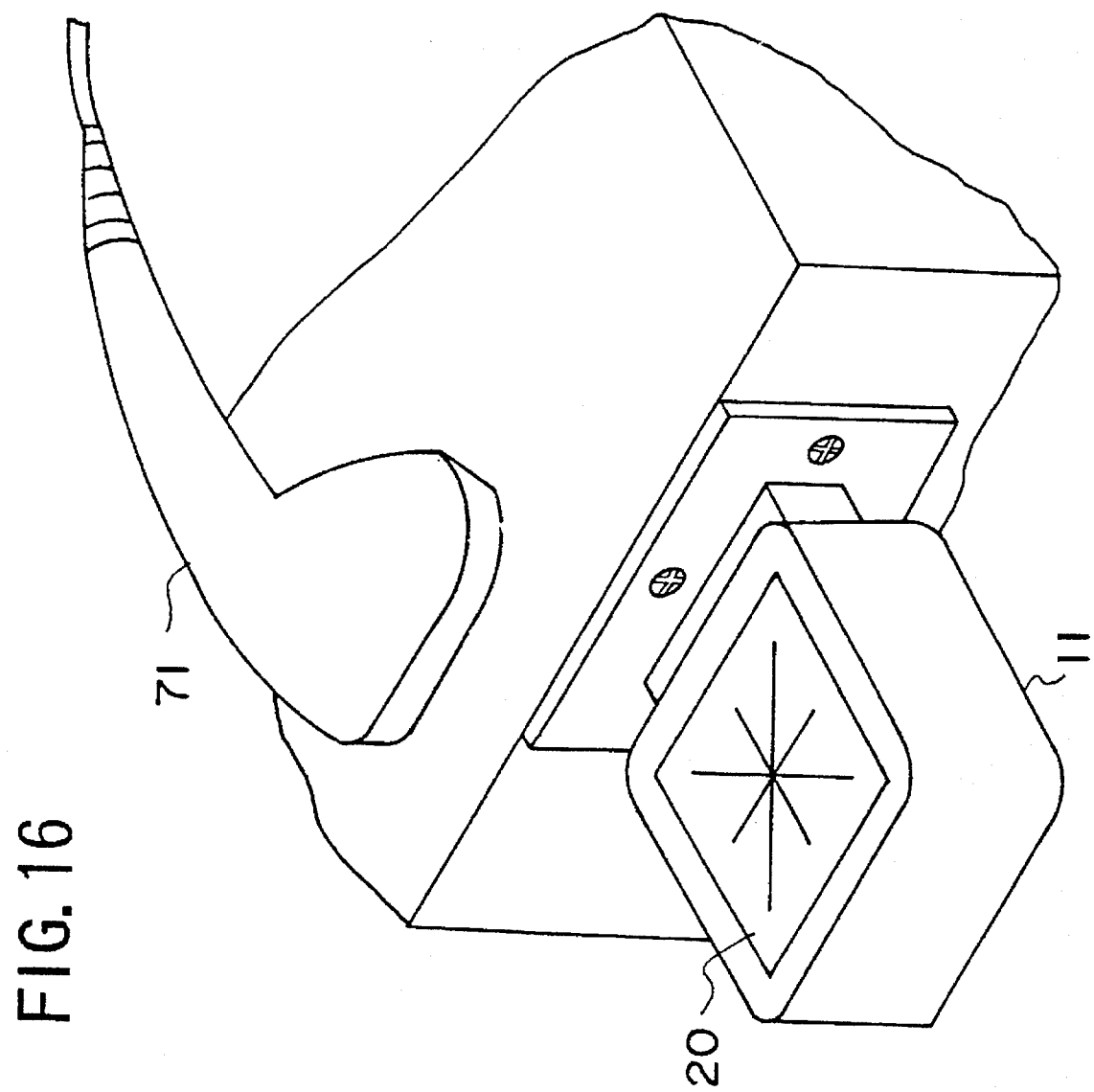
FIG. 16 is an isometric view of the fourth embodiment.

FIG. 15 and FIG. 16 show a block diagram and an isometric view, respectively, of a fourth embodiment of a bar code scanning system according to the present invention. In FIG. 15 and FIG. 16, the same elements as those of FIG. 3 are referred to by the same numerals, and will not be given a further description.

In this fourth embodiment, the bar code scanner 11 is used with a bar code scanner 71 of a hand-scanner type, where the main-second port configuration is employed. The bar code scanner 11 is used as a main scanner, whose input port P1 is connected to an output port P2 of the hand-scanner 71 serving as a second port scanner. The output port P2 of the bar code scanner 11 is connected to a register 72 and thence to a POS system 73.

The hand-scanner 71 comprises an optical detection unit 74 for detecting laser light reflected from a bar code, a decoding circuit 75 for generating bar code data corresponding to the bar code, and the output interface 76 for attaching an ID to the bar code data and modulating the bar code data to transmit it.

The bar code data generated by the hand-scanner 71 is provided for the register 72 and the POS system 73 via the bar code scanner 11 without being subject to any processing by the bar code scanner 11. Also, bar code data generated by the bar code scanner 11 is sent to the register 72 and the POS system 73.

Figure 17A:
FIG. 17 is a time chart showing an operation of the fourth embodiment.
Figure 17B:
Figure 17C:

FIG. 17 shows a time chart showing an operation of the fourth embodiment. As shown at the top of FIG. 17, bar code data read by the hand-scanner 71 has an ID1 attached thereto indicating the identification of the hand-scanner 71, and, as shown at the middle of FIG. 17, bar code data read by the bar code scanner 11 has an ID2 attached thereto indicating the identification of the bar code scanner 11. These two bar code data are provided as separate data for the register 72 and the POS system 73.

In this embodiment, the register 72 handles each bar code data according to an order in which the bar code data is provided from the bar code scanner 11. The handling of the bar code data are indiscriminate regardless of their ID.

Upon receiving bar code data, the register 72 retrieves relevant price data stored in a memory, displays prices one after another, calculates and displays the sum of the prices accumulated after a reset, and prints a receipt. Also, the register 72 carries out product sales management such as checking for each product the number of products sold and the amount of sales revenue, and provides this data for the POS system 73.

The POS system 73 carries out the product sales management based on the data provided by the register 72, such as checking the number of products sold and the amount of sales revenues with regard to each product as well as each shop.

Users of the POS system 73 keep track of the number of each product required to be delivered to each shop based on the product sales management data obtained by the POS system.

The operation of the register 72 has been described particularly with regard to the handling of bar code data constituting one series of data beginning at a reset, but it is not limited to this style of operation. The register may process data based on each ID attached to the bar code data from the bar code scanner 11.

In this case, the register 72 divides the bar code data from the bar code scanner 11 into groups based on the ID attached thereto. This enables the register 72 to display prices, obtain the total price, and print a receipt separately for each ID.

As described above, according to the present invention, an output can be controlled between bar code data detected and generated by the detection means and the conversion means and external data received by the input interface unit, so that the detected bar code data as well as the external data provided for the input interface unit from an external source can be sent out as an output. Thus, with another bar code scanner being attached to the input interface unit, the detected bar code data generated inside as well as external bar code data generated by another bar code can be supplied to a register. This means that a single register having one input interface can be connected to a plurality of bar code scanners and that bar code scanners having different optical systems can be easily attached or removed. Also, even if the bar code scanner does not have any other bar code scanner attached to its input interface, the bar code scanner can provide the register with the bar code data generated inside. Thus, the bar code scanner can be used stand-alone, having a characteristic of being adaptable to various types of operations. Furthermore, the bar code scanner, when attached to bar code scanners of the same type, can easily realize multi-head control. This means that the bar code scanner has an advantage in that it can be used stand-alone as well as in the multi-head control method.

Furthermore, according to the present invention, the external data and the detected data can be combined to produce a single bar code data. That is, the bar code scanner can have another bar code scanner attached to its input interface unit, so that both bar code scanners can read the same bar code by using the detection means and the conversion means, and two bar code data can be combined to produce a single bar code data. This means that a plurality of bar code scanners can constitute a multi-head scanner for reading a single bar code. In other words, even if each of the bar code scanners can read only part of the bar code, the bar code scanners can collectively construct complete bar code data. Thus, a user of the bar code scanning system does not have to pay excessive attention to the positioning of the bar code and the direction of the laser light scanning, so that the processing of the bar code data can be carried out efficiently. Also, these bar code scanners can be cascaded so that only one input interface is required for the register. This means that a multi-head scanner can be realized with a simple configuration.

Also, according to the present invention, the bar code scanner can provide as an output either the detected bar code data generated inside or the external data received by the input interface unit by a switching operation. Thus, another bar code scanner can be attached to the input interface unit, so that both bar code scanners can read different bar code data to provide them to the register. This means that a plurality of bar code scanners can be operated simultaneously to enable efficient reading of bar codes. Also, the bar code scanners can be cascaded to transfer the bar code data, so that the register requires only one input interface.

Furthermore, according to the present invention, an ID code can be attached to bar code data so that the register can identify the origin of bar code data, i.e., which bar code scanner has provided given bar code data. Thus, by using this ID code, the register can derive the amount of sales revenue for each ID code, which enables the calculation of sales revenue for each of the bar code scanners. This means that one register can perform the work load of a plurality of registers, having an advantage of an enhanced and efficient performance.

Also, according to the present invention, more than two bar code scanners can be cascaded by connecting an input interface unit of one bar code scanner with an output interface unit of another bar code scanner so as to realize a multi-head scanner. This multi-head scanner can be connected to a register having a single interface, and, thus, has advantages that the register can have a simple structure and the multi-head scanner can be constructed with a simple configuration. Also, each of the bar code scanners is separate from each other, so that each of them can be arranged in whatever position is desired.

Furthermore, according to the present invention, a management unit can carry out management of objects having a bar code thereon by using bar code data provided by the bar code scanner. The management unit is required to have only one interface in order to process the bar code data from a plurality of bar code scanners, so that the system configuration can be relatively simple.

Also, according to the present invention, the management unit can process the bar code data based on the ID code attached thereto indicating a particular bar code scanner. Thus, even when a plurality of bar code scanners are cascaded, the management unit can process bar code data separately for different ID codes. Thus, the management unit has an advantage in that it can manage products separately for different bar code scanners.

Further, the present invention is not limited to these embodiments, but various variations and modifications may be made without departing from the scope of the present invention.

What is claimed is:

1. A bar code scanner comprising:

detection means for detecting light reflected from a bar code and generating a detection signal;

conversion means for generating detected bar code data based on said detection signal;

an input interface unit receiving external bar code data from another bar code scanner connected thereto;

data control means for combining said detected bar code data and said external bar code data to generate combined bar code data and for providing one of said detected bar code data, said external bar code data, and said combined bar code data as output bar code data; and an output interface unit for sending out said output bar code data.

2. The bar code scanner as claimed in claim 1, wherein said data control means further comprises means for providing as said output bar code data said detected bar code data or said external bar code data by switching between said detected bar code data and said external bar code data.

3. The bar code scanner as claimed in claim 1, wherein said data control means further comprises memory means for storing said detected bar code data and said external bar code data.

4. The bar code scanner as claimed in claim 3, wherein said data control means further comprises multiplexing means for transferring said external bar code data from said input interface unit to said memory means or to said output interface unit according to a flag attached to said external bar code data.

5. A bar code scanner comprising:
   detection means for detecting light reflected from a bar code and generating a detection signal;
   conversion means for generating detected bar code data based on said detection signal;
   an input interface unit receiving external bar code data generated externally;
   data control means for generating output bar code data by either combining said detected bar code data and said external bar code data or providing said detected bar code data or said external bar code data by switching between said detected bar code data and said external bar code data; and
   an output interface unit for sending out said output bar code data.

6. The bar code scanner as claimed in claim 5, wherein said data control means further comprises means for attaching to said detected bar code data an ID code corresponding to said bar code scanner.

7. A bar code scanning system comprising a plurality of bar code scanners, each of which comprises:
   detection means for detecting light reflected from a bar code and generating a detection signal;
   conversion means for generating detected bar code data based on said detection signal;
   an input interface unit receiving external bar code data generated externally;
   data control means for generating output bar code data by using said bar code data and/or said external bar code data from said input interface unit; and
   an output interface unit for sending out said output bar code data;
   wherein said bar code scanners are cascaded by connecting said output interface unit of one bar code scanner with said input interface unit of another bar code scanner.

8. The bar code scanning system as claimed in claim 7, wherein said data control means further comprises means for attaching to said detected bar code data an ID code corresponding to said bar code scanner.

9. The bar code scanning system as claimed in claim 8, further comprising management means for managing records regarding objects scanned by said bar code scanning system, by using said output bar code data corresponding to bar codes attached to the objects.

10. The bar code scanning system as claimed in claim 9, wherein said management means further comprises means for managing said records regarding said objects separately for each of said bar code scanners by using said ID code unique to each of said bar code scanners.

11. The bar code scanning system as claimed in claim 7, wherein a plurality of said output bar code data generated by said plurality of bar code scanners are combined together to provide single bar code data, so that said bar code scanning system serves as a multi-head scanning device.

12. The bar code scanning system as claimed in claim 7, further comprising management means for managing records regarding objects scanned by said bar code scanning system, by using said output bar code data corresponding to bar codes attached to the objects.

13. A bar code scanning system comprising a plurality of bar code scanners, each of which comprises:
   detection means for detecting light reflected from a bar code and generating a detection signal;
   conversion means for generating detected bar code data based on said detection signal;
   an input interface unit receiving external bar code data generated externally;
   data control means for generating output bar code data by either combining said detected bar code data and said external bar code data or providing said detected bar code data or said external bar code data by switching between said detected bar code data and said external bar code data; and
   an output interface unit for sending out said output bar code data;
   wherein said bar code scanners are cascaded by connecting said output interface unit of one bar code scanner with said input interface unit of another bar code scanner.

14. The bar code scanning system as claimed in claim 13, wherein said data control means further comprises means for attaching to said detected bar code data an ID code corresponding to said bar code scanner.

15. The bar code scanning system as claimed in claim 13, wherein a plurality of said output bar code data generated by said plurality of bar code scanners are combined together to provide single bar code data, so that said bar code scanning system serves as a multi-head scanning device.

16. The bar code scanning system as claimed in claim 13, further comprising management means for managing records regarding objects scanned by said bar code scanning system, by using said output bar code data corresponding to bar codes attached to the objects.

17. A bar code scanner comprising:
   detection means for detecting light reflected from a bar code and generating a detection signal;
   conversion means for generating detected bar code data based on said detection signal;
   an input interface unit receiving external bar code data from another bar code scanner connected thereto;
   data control means for providing as output bar code data said detected bar code data or said external bar code data by switching between said detected bar code data and said external bar code data; and
   an output interface unit for sending out said output bar code data.

18. The bar code scanner as claimed in claim 17, wherein said data control means further comprises multiplexing means for transferring said detected bar code data to said output interface unit when said input interface unit provides no interruption and for transferring said external bar code data from said input interface unit to said output interface unit when said input interface unit provides an interruption.

* * * * *